Aug. 3, 1954          A. E. FALK          2,685,687

IMPULSE GENERATOR FOR TIME INDICATION

Filed April 27, 1948

*INVENTOR.*
ALFRED E. FALK

BY

ATTORNEY

Patented Aug. 3, 1954

2,685,687

UNITED STATES PATENT OFFICE 2,685,687

IMPULSE GENERATOR FOR TIME INDICATION

Alfred E. Falk, Fort Wayne, Ind., assignor to Farnsworth Research Corporation, a corporation of Delaware Application April 27, 1948, Serial No. 23,575

13 Claims. (Cl. 343—13)

This invention relates to radio ranging systems and has particular reference to a system of this character employed to develop a signal effect whenever a moving vehicle is at a predetermined distance from a given object.

In certain war time operations the bombing mechanism mounted in an aircraft is automatically controlled to release a bomb or bombs whenever the aircraft, in making its bombing run, arrives at a point in space which is a predetermined distance away from the target upon which the bombs are intended to be dropped. This predetermined point in space may be quite accurately determined in advance. It depends upon such factors as the altitude of the aircraft and its ground speed, the weight and configuration of the bomb, the direction and velocity of the wind, and so forth.

Another application of apparatus of the general character to which the present invention relates is the determination of the approach of a vehicle such as an airplane or a marine vessel to an obstruction such as a mountain or an iceberg. In systems of this character it is usual to determine in advance the closest approach to such an obstacle that the vehicle may make with reasonable safety. In the case of an aircraft approaching an unseen mountain, the safest distance which it may approach the mountain is one which will allow it sufficient time to alter its course either by climbing to a higher elevation or by deviating to one side or the other sufficiently to avoid striking the obstruction. In the case of a marine vessel its course obviously may be altered only in a horizontal direction. A radio ranging system employed for such purposes usually is required only to give an indication that the obstacle is in the path of the vehicle at some predetermined distance.

In one form of radio ranging apparatus suitable for use for purposes such as those descerbed it is the practice to locally develop first and second timing impulses which are spaced apart in time proportionally to the predetermined distance between the vehicle and the object. The radio ranging apparatus commonly known as radar equipment is employed to radiate an impulse of ultra high frequency radiant energy at a time corresponding with the development of a first one of the timing impulses. When subsequently a portion of the transmitted energy is received after reflection from the object it is employed to develop a third timing impulse. The time relationship between this third impulse and the first timing impulse is a measure of the distance or range at which the object is located with respect to the aircraft. The locally generated second timing impulse and the third timing impulse are impressed upon a coincidence circuit which is rendered operative only when the two impulses are impressed thereon concurrently. Response by the coincidence circuit then may be employed for such purposes as the release of a bomb load, the operation of a warning signal, and the like, depending upon the use to which the system is put.

It usually is convenient to develop the various voltage impulses used for timing purposes in apparatus of the character described by deriving them from saw-tooth voltage waves. A saw-tooth voltage may be developed in such a manner that it varies linearly in a predetermined interval of time between two known voltages. In such a case any intermediate voltage on the saw-tooth wave, when referred to the initial limiting voltage, is proportional to the time required for the saw-tooth voltage to increase from its initial limiting value to the intermediate voltage. By superimposing the saw-tooth voltage upon a unidirectional voltage and then impressing the combined voltage wave upon an electronic device having a threshold characteristic, a response may be secured from the threshold device at any predetermined voltage depending upon the magnitude of the unidirectional voltage.

Radio ranging apparatus of the character described usually utilizes two channels terminating in a common coincidence circuit. In one channel a saw-tooth voltage wave is combined with a fixed predetermined unidirectional voltage whereby to effect the development of a timing impulse at such a time after the initiation of the saw-tooth wave that it is representative of the predetermined distance between the vehicle and the obstacle. The other channel of such equipment is substantially similar except that the unidirectional voltage with which the saw-tooth voltage wave is combined is not constant in magnitude. It is made to vary in response to the radar apparatus so that it is representative of the instantaneous distance or range between the vehicle and the object. When the combined saw-tooth and unidirectional voltages employed in this channel are impressed upon the threshold device, there is effected the development of another timing impulse which is related in time to the initial timing impulse in correspondence with the instantaneous distance between the vehicle and the obstacle. As this distance decreases, the time interval between the initial timing impulse and the impulse representative of the instantaneous distance decreases until the predetermined distance is reached at which time there should be coincidence between the second and third timing impulses.

Prior art apparatus of the general character described utilizes separate saw-tooth voltage generators in the respective channels of the apparatus. These generators may be made identically and, under perfect operating conditions, may be caused to generate saw-tooth voltage waves which also are identical in all respects.

However, in practice there are encountered such things as plate voltage fluctuations, discrepancies between cathode heater voltages in different tubes and even slightly varying characteristics of the tubes themselves. It is virtually impossible to anticipate these discrepancies since many of them occur in a more or less random manner. Consequently, the saw-tooth voltage waves which are developed in the individual channels frequently are not identical. Inasmuch as these voltage waves are the bases of the timing operations of the apparatus, it is seen that any lack of identity in the saw-tooth waves will have a detrimental effect on the timing accuracy of the apparatus. In the case of bombing operations it is highly essential that the timing be of a relatively high order of precision. Accordingly, any substantial lack of identity between the saw-tooth voltage waves could affect the operation of the bomb releasing mechanism sufficiently to cause the bombs to completely miss their target.

Furthermore, in prior art apparatus, since one of the channels is required to operate in a constant manner and the other channel is required to operate in a variable fashion, it has been the practice to attempt to take advantage of this condition. The tube complement in the channel operating in a constant manner has been somewhat less than in the other channel. It has been found however that this lack of symmetry between the two channels also has a tendency to render the operation of the device less precise than it is desired.

It, therefore, is an object of the present invention to provide an impulse generator suitable for use in radio ranging apparatus of the character described which will considerably increase the operating precision of the apparatus.

Another object of the invention is to provide, in radio ranging apparatus of the character described wherein timing impulses are developed in two separate channels, a voltage impulse generator employing a single saw-tooth voltage generator for both of the channels.

Still another object of the invention is to provide two symmetrical channels for the generation of voltage impulses for use in radio ranging apparatus of the character described.

In accordance with this invention there is provided radio ranging apparatus which includes a transmitter and a receiver of ultra high frequency radiant energy. The transmitter functions to periodically transmit impulses of radiant energy such as an ultra high frequency radio wave. The transmission of this energy is directed toward an object or target. A reflection of this radiant energy from the target is impressed upon the radio receiver and the time elapsed between the transmission and reception of the energy impulse is a measure of the distance between the vehicle and the reflecting object.

According to the principal feature of the invention, the apparatus includes a source of impulses which is coupled to the radio transmitter and also to a saw-tooth voltage generator so that there may be developed a saw-tooth voltage wave which is accurately synchronized with the transmission of the radiant energy impulses. The saw-tooth voltage wave is impressed simultaneously upon release and range channels, each of which includes identical apparatus. The apparatus of each channel may include a level control facility, a threshold amplifier and an impulse generator arranged in series in that order. The impulse generators are coupled to a common coincidence circuit which is employed to control apparatus such as the bomb releasing mechanism or an indicator such as a warning signal in the aircraft or other moving vehicle such as a marine vessel. In either of the two channels the level of the saw-tooth voltage wave is determined by combining a unidirectional voltage with the saw-tooth voltage. By this means each of the saw-tooth voltage waves is caused to reach a predetermined threshold value at a time following the initiation of the waves which is dependent upon the respective magnitudes of the unidirectional voltages. The threshold amplifiers become operative at a predetermined threshold value to cause responses by the associated impulse generators whereby to develop timing impulses. The impression of these timing impulses upon the coincidence circuit produces a response by this circuit only when the impulses are impressed thereon concurrently.

In the release channel of the equipment the level control facility is set at some constant value which is determined by the predetermined distance between the vehicle and the object which it is approaching. In the case of a bombing aircraft, this distance is equal to that between the target and the point in space at which it is desired to release the bombs. In the case of a warning system the distance is that at which it is desired to give a warning to the operator of the vehicle that he is approaching an obstacle. In the latter case the distance is sufficiently great to enable the operator to alter his course suitably to avoid the obstacle.

In the range channel of the apparatus the level control mechanism is coupled to the radio receiver. By such means the unidirectional voltage which is combined with the saw-tooth voltage may be varied in magnitude in accordance with the information provided by the radio receiver regarding the distance between the vehicle and the object or the target. As this distance decreases, a suitable variation is automatically made in the magnitude of the unidirectional voltage whereby to alter the level of the saw-tooth voltage wave.

For a better understanding of the invention, together with other and further objects thereof, reference is made to the following description, taken in connection with the accompanying drawing, and its scope will be pointed out in the appended claims.

Figure 1:
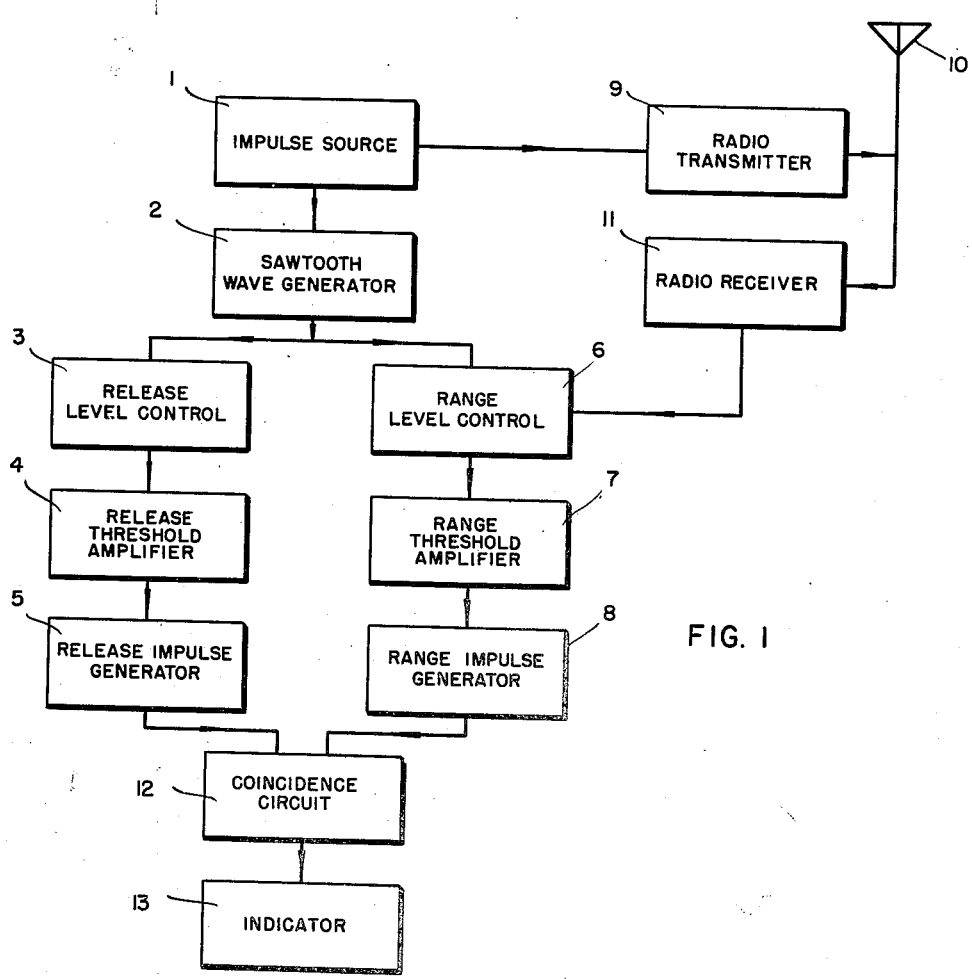
Fig. 1 is a block diagram of apparatus embodying the present invention.

Referring now to Fig. 1 of the drawing, there is shown a source 1 of periodic impulses. The impulse source is coupled to a saw-tooth voltage generator 2. The output circuit of the saw-tooth voltage generator is impressed upon the apparatus of a release channel and a range channel. Specifically, the generator 2 is coupled to the input circuit of a release channel level control 3. This apparatus comprises means for combining the saw-tooth voltage wave with a unidirectional voltage as for example a biasing voltage. It also includes conventional bias control means such as a potentiometer, for example, of varying the magnitude of the unidirectional voltage whereby to vary the operating level of the saw-tooth voltage wave. The output circuit of the release channel level control is coupled to a release channel threshold amplifier. This apparatus may be a conventional vacuum tube amplifier provided with suitable biasing facilities whereby it is rendered operative only when the voltage impressed upon the input circuit thereof reaches a predetermined threshold value. The output circuit of the threshold amplifier 4 is coupled to a release channel timing impulse generator 5. This generator also may be entirely conventional and for example may be a blocking oscillator or a multivibrator. The generator preferably has the characteristic of being triggered for a one cycle oscillation, by the impression upon its input circuit of a suitable triggering voltage.

The range channel of the apparatus also comprises a level control facility 6 to which is coupled a threshold amplifier 7 having its output circuit coupled to a timing impulse generator 8. Corresponding apparatus in the respective channels of the equipment should be made as nearly identical as possible. In a preferred form of the invention dual vacuum tubes have been employed successfully. For example, one half of one dual tube is used for the release channel level control and the other half for the range channel level control. Similarly, other dual tubes have been utilized for the two threshold amplifiers and for the timing impulse generators. In the case of the range channel level control it is provided with a facility for varying automatically the magnitude of the unidirectional bias voltage with which the saw-tooth voltage is combined in response to the received echo pulse.

The ranging apparatus also includes a radio transmitter 9 which is coupled for control to the impulse source 1. The transmitter preferably is one capable of developing and transmitting impulses of ultra high frequency radiant energy such as radio waves. The transmitter 9 is coupled to an antenna 10 by which the impulsive radiant energy is radiated. There also is provided a radio receiver 11 coupled to the antenna 10 whereby reflections of the transmitted energy may be received. Preferably, in accordance with common radio ranging practice, the antenna 10 is made high directive in order that the transmitted energy may be concentrated into a relatively narrow beam and also whereby the energy intercepted by the antenna will be derived only by reflection from an object located in the path of the narrow beam. The output of the radio receiver 11 is coupled to the range channel level control 6 whereby the magnitude of the unidirectional voltage may be varied in accordance with the information received by the radio receiver.

Finally, the output circuits of the release and range channel timing impulse generators 5 and 8 respectively are coupled to a coincidence circuit 12. This circuit may include a multigrid vacuum tube. The output circuit of the impulse generator 5 may be coupled to one grid of this tube, while the output circuit of the impulse generator 8 may be coupled to another grid. Such a device is conventional and need not be shown here in detail in order to afford a complete understanding of the present invention. A coincidence circuit of this character is rendered operative only when the voltage impulses impressed upon the respective grids thereof occur together in time. Otherwise no response is produced by the coincidence circuit.

The output of the coincidence device 12 is coupled to the controlled apparatus such as the indicator 13 illustrated in the drawing. In the case where the apparatus is to be used to warn the operator of a moving vehicle of the approach by the vehicle to an obstacle located in its path, the indicator may be a light-producing or a sound-producing device or a combination of these or other known devices. In the case where the apparatus is to be used in conjunction with the release of bombs from an aircraft, the controlled apparatus 13 may be the bomb releasing mechanism.

Figure 2:
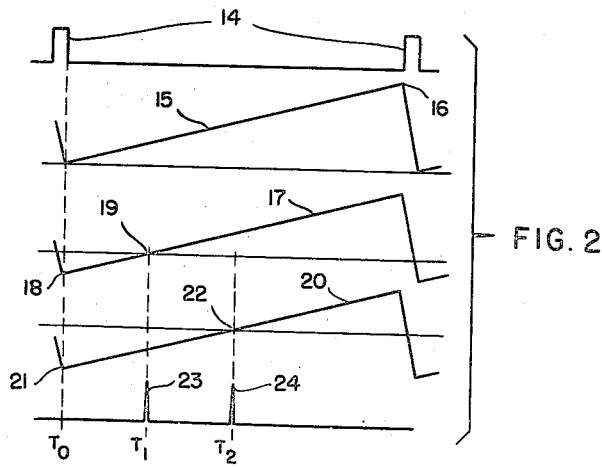
Fig. 2 is a set of curves illustrating the operation of the apparatus.

Referring now to the operation of the apparatus embodying the present invention, it will be described in conjunction with both Figs. 1 and 2. In Fig. 2 there are illustrated two of the periodic impulses 14 generated by the impulse source 1 of Fig. 1. These impulses are impressed upon the saw-tooth voltage generator 2 whereby to control in a well-known manner the development of a saw-tooth voltage wave, one cycle of which is illustrated at 15 in Fig. 2. The saw-tooth wave is developed in such a manner that the voltage rises from some minimum value such as zero to a known value such as indicated at 16 in a given interval of time. The saw-tooth voltage generator is of such a character that the developed voltage is linear between its two limits. Consequently, the time required for the voltage to increase from its lower limit to any predetermined voltage may be accurately determined.

The saw-tooth voltage wave developed by the generator 2 is impressed upon both channels of the apparatus by any suitable alternating current coupling such as a condenser. Consequently, the saw-tooth voltages which are impressed upon the release channel level control apparatus 3 and the range channel level control apparatus 6 are not fixed in their relationships to any predetermined reference voltage such as ground. Thus, there may be combined with the saw-tooth voltages in the respective channels unidirectional voltages of any desired magnitudes whereby to establish the level of the saw-tooth voltages independently of one another in the two channels. The unidirectional voltage which is combined with the saw-tooth voltage in the release channel will be assumed to have a fixed predetermined negative value. Consequently, the lower limiting voltage of the saw-tooth wave will be negative with respect to ground. The curve 17 of Fig. 2 represents the level at which the saw-tooth voltage wave is established in the release channel of the apparatus. It is seen that the lower limiting voltage represented at 18 is of negative polarity with respect to ground. This limiting voltage is produced at the beginning of a timing cycle which is indicated at $T_0$. The magnitude of this negative voltage, which also corresponds to the magnitude of the unidirectional voltage employed in this channel, is such that the saw-tooth voltage wave reaches ground or zero potential shown at 19 at time $T_1$. Thereafter during the excursion of the saw-tooth voltage wave it is of positive polarity. Ground potential is referred to in the present description solely for the purpose of convenience, it being assumed that the threshold amplifiers 4 and 7 are arranged to become operative in response to the impression upon the respective input circuits of a voltage having ground potential. Obviously by suitably biasing these amplifiers, other threshold values may be employed.

If it be assumed that, at the start of the operation under consideration the vehicle is at a distance which is greater than the critical distance from the object or target, the information regarding the magnitude of this distance is derived from the radio transmitter 9 and receiver 11 in the conventional manner of radio ranging apparatus. There is, therefore, impressed upon the range channel level control circuit 6 a signal effect which is representative of this distance. This signal effect is employed to develop a unidirectional voltage having a magnitude proportional to the distance between the apparatus and the target. In the case assumed the unidirectional voltage will be of negative polarity and of a magnitude which is greater than the unidirectional voltage employed in the release channel level control apparatus 3. The saw-tooth voltage wave which results from the combination of the wave derived from the generator 2 and the unidirectional voltage developed in the range channel level control circuit 6 is illustrated at 20 of Fig. 2. In view of the fact that the combining unidirectional voltage is of greater negative value than that employed in the release channel, it is seen that the curve 20 starts at a lower limiting value 21 which is more negative with respect to ground than the lower limiting value 18 of the release channel wave 17. Consequently, the range channel saw-tooth wave 20 does not reach ground potential 22 until time $T_2$ which is later than the time $T_1$ for the release channel.

At time $T_1$, when the release channel saw-tooth voltage wave 17 reaches the threshold level 19, there is effected a response by the release channel amplifier 4. This apparatus then becomes operative to trigger the release channel timing impulse generator 5 to develop an impulse 23. Later in the operation of the apparatus the range channel threshold amplifier 7 is rendered operative at time $T_2$ when the saw-tooth voltage wave 20 reaches the ground potential 22. The range channel timing impulse generator 8 is triggered to develop an impulse 24 at this time.

It is seen that the impulses 23 and 24 are developed at two different times under the conditions assumed to exist. These impulses both are impressed upon the coincidence circuit 12. However, since they are not impressed upon this circuit concurrently, the circuit does not respond. Consequently, the controlled circuit such as the indicator 13 is not energized.

However, as the vehicle approaches closer to the target, the range channel level control apparatus 6 functions to decrease the magnitude of the unidirectional voltage with which the saw-tooth wave is combined. As a consequence, the saw-tooth wave 20 starts at a lower limiting value which is smaller than the initial limiting value described. The saw-tooth voltage wave, therefore, reaches the threshold value sooner than it did, resulting in the development of an impulse corresponding to the impulse 24 at an earlier time.

The apparatus functions in this way to automatically vary the level setting of the saw-tooth wave 20 until it is substantially equal to the setting of the saw-tooth voltage wave 17. Under these conditions the saw-tooth voltage waves in both channels reach the threshold values at substantially the same time. Accordingly, impulses 23 and 24 developed in the release and range channels respectively occur in the output circuits of the timing impulse generators 5 and 8 concurrently. Thus, there are impressed upon the coincidence circuit 12 two voltage impulses derived from the two respective channels of the apparatus substantially concurrently. The coincidence circuit is rendered operative to develop a signal effect for impression upon the controlled circuit such as the indicator 13, thereby giving a warning that a vehicle is at a critical distance from the target or operating a bomb release mechanism or performing any other desired function.

It is seen that the use which is made of the saw-tooth voltage waves in the respective channels of the apparatus as a means for developing signal effects which are representative of distances makes it highly desirable that the saw-tooth voltage waves which are effective in the respective channels be as nearly identical in all respects as possible. Otherwise the saw-tooth voltages are quite likely to reach the threshold value at times which are not necessarily representative of the distance which it is desired to measure. By employing apparatus in accordance with the present invention there is no possibility of a discrepancy between the saw-tooth voltage waves employed in the two channels for the reason that the same saw-tooth voltage is impressed upon both channels. Also by making the two channels identical in the components used, the likelihood that the saw-tooth voltage waves will be distorted in one or the other channel is minimized. Not only is it desirable to make the two channels identical as far as the apparatus is concerned, but also by using dual tubes, one half of each of which is included in one channel and the other half of each of which is included in the other channel, certain other possibilities for discrepancies between the two channels are effectively eliminated. For example, the cathode heater circuits of the tubes are subject to the same, if any, fluctuations in the voltage supplies thereto. Additionally, in many dual tubes the two space discharge paths are served by a common cathode thereby eliminating another possibility of a difference in performance.

There obviously are many uses for apparatus of the general character described. Two of such uses have been referred to in conjunction with the present description of an illustrative embodiment of the invention. It is therefore contemplated that the principles underlying this invention are sufficiently broad to be applicable to systems other than those specifically described herein.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In radio ranging apparatus for use with a relatively movable reflecting object, means for generating a saw-tooth wave, a release channel circuit and a range channel circuit, means for impressing said saw-tooth wave simultaneously upon both of said channel circuits, means in said release channel circuit responsive to a predetermined amplitude of said saw-tooth wave for developing a first series of timing impulses, means in said range channel circuit responsive to a variable amplitude value of said saw-tooth wave for developing a second series of timing impulses, means for varying the amplitude value of said range channel saw-tooth wave in correspondence with the distance between said object and said ranging apparatus, and means to be controlled operable in response to the concurrence of one of said second series of timing impulses and one of said first series of timing impulses.

2. In radio ranging apparatus for use with a relatively movable reflecting object, means for generating a saw-tooth wave, a release channel circuit and a range channel circuit for separately generating two series of timing impulses, means for impressing said saw-tooth wave simultaneously upon both of said channel circuits, means in said release channel circuit for establishing a reference voltage for said saw-tooth wave at a predetermined constant amplitude, means in said range channel circuit for establishing a reference voltage for said saw-tooth wave of a variable amplitude, means for varying the magnitude of said range channel reference voltage in correspondence with the distance between said object and said ranging apparatus, means in the respective release and range channel circuits responsive to a predetermined amplitude of said saw-tooth waves for developing respective series of timing impulses, and means to be controlled operable in response to the concurrence of impulses derived respectively from said release channel and said range channel.

3. In radio ranging apparatus for use with a relatively movable reflecting object, a saw-tooth wave generator, a release channel circuit and a range channel circuit for separately generating two timing impulses, a first bias control apparatus in said release channel circuit for establishing a reference voltage for said saw-tooth wave at a predetermined constant amplitude, a second bias control apparatus in said range channel circuit to establish a variable amplitude reference voltage for said saw-tooth voltage wave, means responsive to said ranging apparatus to vary said range channel reference voltage in correspondence with the distance between an object and said ranging apparatus, means in said release and range channel circuits responsive to a predetermined amplitude value of the respective saw-tooth voltage waves for developing said timing impulses, a coincidence circuit operable in response to the concurrent impression thereon of two of said timing impulses, and a controlled circuit coupled to said coincidence circuit for response to the operation of said coincidence circuit.

4. In radio ranging apparatus for use with a relatively movable reflecting object, means for generating a saw-tooth wave, a release channel circuit for developing a first series of timing impulses in response to a predetermined amplitude value of said saw-tooth wave, means in said release channel circuit for establishing a fixed reference voltage for said saw-tooth wave whereby to effect the development of said first series of timing impulses at a predetermined time after the initiation of said saw-tooth wave, a range channel circuit for generating a second series of timing impulses in response to a predetermined value of said saw-tooth wave, means in said range channel circuit for developing a variable reference voltage for said saw-tooth wave whereby to effect the development of said second series of timing impulses at times following the initiation of the saw-tooth wave corresponding to the magnitude of said variable reference voltage, means for varying the reference voltage of said range channel circuit in response to said ranging apparatus whereby its magnitude corresponds with the distance between an object and said ranging apparatus, means coupled to said release and ranging channel circuits and responsive only to the concurrent impression thereon of timing impulses derived from the respective channels, and means to be controlled coupled to said last-named means for response to the operation thereof.

5. In radio ranging apparatus for use with a relatively movable reflecting object, a source of impulses, means responsive to said impulses to generate a saw-tooth wave, a release channel circuit and a range channel circuit for separately generating two timing impulses, each of said channel circuits having equipment including a bias level control apparatus and a timing impulse generator, said level control apparatus of the respective channels each including means for establishing a reference voltage for said saw-tooth voltage wave whereby to determine the times at which the respective saw-tooth voltage waves reach a predetermined value at which to trigger the respective timing impulse generators, each of said timing impulse generators serving to generate a voltage impulse upon being rendered operative, means to establish said reference voltage in said release channel circuit at a predetermined constant value, whereby to effect the development by said release channel timing impulse generator of a first timing impulse at a time after the initiation of each cycle of said saw-tooth voltage wave representative of a predetermined distance from said ranging apparatus, means responsive to said ranging apparatus to establish said reference voltage in said range channel circuit in correspondence with the distance between said object and said ranging apparatus, whereby to effect the development by said range channel timing impulse generator of a second timing impulse at a time after the initiation of each cycle of said saw-tooth wave representative of the distance of said object from said ranging apparatus, a coincidence circuit operable in response to the concurrent impression thereon of said two timing impulses, and a controlled circuit coupled to said coincidence circuit for response to the operation of said coincidence circuit.

6. In radio ranging apparatus for use with a relatively movable reflecting object, a timing device comprising a source of impulses, a saw-tooth wave generator responsive to said impulses to initiate the generation of successive cycles of a saw-tooth wave, a release channel circuit and a range channel circuit for separately generating two timing impulses, each of said channel circuits having equipment including a bias level control apparatus, a threshold amplifier, and a timing impulse generator, said level control apparatus of the respective channels each including means for combining said saw-tooth voltage wave with a unidirectional voltage, the magnitude of the unidirectional voltages determining the times at which the respective saw-tooth waves reach a predetermined value at which the threshold amplifiers become operative to trigger the respective timing impulse generators, each of said timing impulse generators serving to generate a voltage impulse upon being rendered operative, means to establish at a predetermined constant value the magnitude of the unidirectional voltage in the level control apparatus of said release channel circuit, whereby to effect the development by said release channel timing impulse generator of a first timing impulse at a time after the initiation of each cycle of said saw-tooth voltage wave representative of a predetermined distance from said ranging apparatus, means to radiate an impulse of radiant energy concurrently with the initiation of each cycle of said saw-tooth voltage wave, means responsive to reflections of said radiated impulses from an object to vary the magnitude of the unidirectional voltage in said range channel level control apparatus in correspondence with the length of the time interval between the radiation of the impulse of energy by said transmitter and the reception of the reflected energy by said receiver, whereby to effect the development by said range channel timing impulse generator of a second timing impulse at a time after the initiation of each cycle of said saw-tooth wave representative of the distance of said object from said ranging apparatus, a coincidence circuit operable in response to the concurrent impression thereon of the voltage impulses derived from the respective timing impulse generators, and a controlled circuit coupled to said coincidence circuit for response to the operation of said coincidence circuit.

7. In a radio ranging apparatus for use with a relatively movable reflecting object, a timing device comprising a source of periodic impulses, a saw-tooth wave generator coupled to said impulse source, a release channel circuit and a range channel circuit for separately generating two timing impulses, each of said channels having equipment including a series arrangement of a bias level control apparatus, a threshold amplifier, and a timing impulse generator, said level control apparatus of the respective channels being coupled to said saw-tooth voltage generator and each comprising means for combining said saw-tooth voltage wave with a unidirectional voltage, the magnitude of the unidirectional voltages determining the times at which the respective saw-tooth voltage waves reach a predetermined value at which the threshold amplifiers become operative to trigger the respective timing impulse generators, each of said timing impulse generators serving to generate a timing impulse upon being rendered operative, means in the level control apparatus of said release channel circuit to establish the magnitude of the unidirectional voltage at a predetermined constant value, whereby to effect the development by said release channel timing impulse generator of a first timing impulse at a time after the initiation of each cycle of said saw-tooth voltage wave representative of a predetermined distance from said ranging apparatus, a radio transmitter to radiate an impulse of radiant energy concurrently with the initiation of each cycle of said saw-tooth voltage wave, a radio receiver responsive to reflections of said radiated impulses from an object, said radio receiver being effective to vary the magnitude of the unidirectional voltage in said range channel level control apparatus in correspondence with the length of the time interval between the radiation of the impulse of energy by said transmitter and the reception of the reflected energy by said receiver, whereby to effect the development by said range channel timing impulse generator of a second timing impulse at a time after the initiation of each cycle of said saw-tooth wave representative of the distance of said object from said ranging apparatus, a coincidence circuit responsive to the timing impulse generators of the respective channels and being operable only when the timing impulses derived from the respective timing impulse generators are impressed thereon concurrently, and a controlled circuit coupled to said coincidence circuit for response to the operation of said coincidence circuit.

8. In radio ranging apparatus for use with a relatively movable reflecting object, a timing device comprising a source of periodic impulses, a saw-tooth wave generator coupled to said impulse source for synchronization, a release channel circuit and a range channel circuit for separately generating two timing impulses, each of said channels having identical equipment and each comprising a series arrangement of a bias level control apparatus, a threshold amplifier, and a timing impulse generator, said level control apparatus of the respective channels being coupled to said saw-tooth voltage generator and each comprising means for combining said saw-tooth voltage wave with a unidirectional voltage, the magnitude of the unidirectional voltages determining the times at which the respective saw-tooth voltage waves reach a predetermined value at which the threshold amplifiers become operative to trigger the respective timing impulse generators, each of said timing impulse generators serving to generate a timing impulse upon being rendered operative, means in the level control apparatus of said release channel circuit to establish the magnitude of the unidirectional voltage at a predetermined constant value, whereby to effect the development by said release channel timing impulse generator of a first timing impulse at a time after the initiation of each cycle of said saw-tooth voltage wave representative of a predetermined distance from said ranging apparatus, a radio transmitter coupled to said impulse source to radiate an impulse of ultra high frequency energy concurrently with the initiation of each cycle of said saw-tooth voltage wave, a radio receiver responsive to reflections of said radiated impulses from an object, said radio receiver being coupled to said range channel level control apparatus to vary the magnitude of the unidirectional voltage in correspondence with the length of the time interval between the radiation of the impulse of energy by said transmitter and the reception of the reflected energy by said receiver, whereby to effect the development by said range channel timing impulse generator of a second timing impulse at a time after the initiation of each cycle of said saw-tooth wave representative of the distance of said object from said ranging apparatus, a coincidence circuit coupled to the timing impulse generators of the respective channels and being operable only when the timing impulses derived from the respective timing impulse generators are impressed thereon concurrently, and a controlled circuit coupled to said coincidence circuit for response to the operation of said coincidence circuit.

9. An indicator circuit for indicating the time coincidence of a variably recurring phenomena and a predetermined timing of a recurring phenomena within a given recurring interval, comprising means for generating a control wave having a period equal to said interval, means for generating a first series of pulses at said predetermined timing interval in response to said control wave, means for generating a second series of pulses having a variable timing in response to said variable recurring phenomena and said control wave combined, a coincidence circuit, means for applying said first and second series of pulses to said coincidence circuit to operate it upon time coincidence of said applied pulses, and an indicator responsive to operation of said coincidence circuit.

10. An indicator circuit for indicating a predetermined timing of a given series of variably timed pulses relative to a predetermined timing wave, comprising a timing wave generator producing a wave varying in amplitude by a predetermined law, a first circuit biased to respond to a predetermined amplitude of said timing wave coupled with said timing wave generator, a first pulse generator for generating pulses in response to each response of said first circuit, a second circuit coupled with said timing wave generator and biased in response to said variably timed pulses to respond to a variable amplitude of said timing wave, a second pulse generator for generating pulses in response to each response of said second circuit, an indicator, and a coincidence circuit between said generators and said indicator for producing an indication in response to coincidence of pulses from said generator.

11. In a radio ranging apparatus for a relatively movable object, an impulse generator, means for transmitting said generated impulses, means for receiving said transmitted impulses after reflection from a movable object, and an indicator for indicating the distance of said object, a circuit for rendering said indicator operative at a given distance of said object relative to said device, comprising a sawtooth wave generator timed with the generation of said impulses, a first circuit coupled to said sawtooth wave generator biased to operate at a predetermined amplitude level of said sawtooth wave, a first pulse generator, means for generating pulses in response to operation of said first circuit, a second circuit coupled to said sawtooth wave generator and said means for receiving said pulses and biased under control of said received pulses to operate at a variable amplitude level of said sawtooth wave in response to said received impulses, a second pulse generator for generating pulses in response to operation of said second circuit, and a coincidence circuit coupled between said pulse generators and said indicator, and responsive to time coincidence of said indicator for operating said indicator.

12. In a radio ranging apparatus for use with a relatively movable reflecting object, means for generating a control wave, a release channel circuit and a range channel circuit, means for impressing said control wave simultaneously upon both of said channel circuits, means in said release channel circuit responsive to a predetermined amplitude of said control wave for developing a first series of timing impulses, means in said range channel circuit responsive to a variable critical amplitude value of said control wave for developing a second series of timing impulses, means for varying the amplitude value of said range channel control wave in correspondence with the distance between said object and said ranging apparatus, and means to be controlled operable in response to the concurrence of one of said second series of timing impulses and one of said first series of timing impulses.

13. An indicator circuit for indicating the time coincidence of a variably recurring phenomena and a predetermined timing of a recurring phenomena within a given recurring interval, comprising means for generating a control wave having a period equal to said interval, first means for generating a first series of pulses at said predetermined timing interval, second means for generating a second series of pulses at a variable timing interval, both said first and second means being operatively coupled to said control wave means to be supplied with the control wave of the latter, said first means operating in response to said control wave, said second means operating in response to said variably recurring phenomena and said control wave combined, a coincidence circuit, means for applying said first and second series of pulses to said coincidence circuit to operate it upon time coincidence of said applied pulses, and an indicator responsive to operation of said coincidence circuit.

References Cited in the file of this patent

UNITED STATES PATENTS

| Number | Name | Date |
|---|---|---|
| 2,403,527 | Hershberger | July 9, 1946 |
| 2,418,127 | Labin | Apr. 1, 1947 |
| 2,428,427 | Loughren | Oct. 7, 1947 |
| 2,433,667 | Hollingsworth | Dec. 30, 1947 |
| 2,434,813 | Sanders | Jan. 20, 1948 |
| 2,466,044 | Schoenfeld | Apr. 5, 1949 |
| 2,484,352 | Miller et al. | Oct. 11, 1949 |
| 2,494,339 | Keister | Jan. 10, 1950 |
| 2,560,289 | Hasbrook | July 10, 1951 |